Patented Feb. 15, 1949

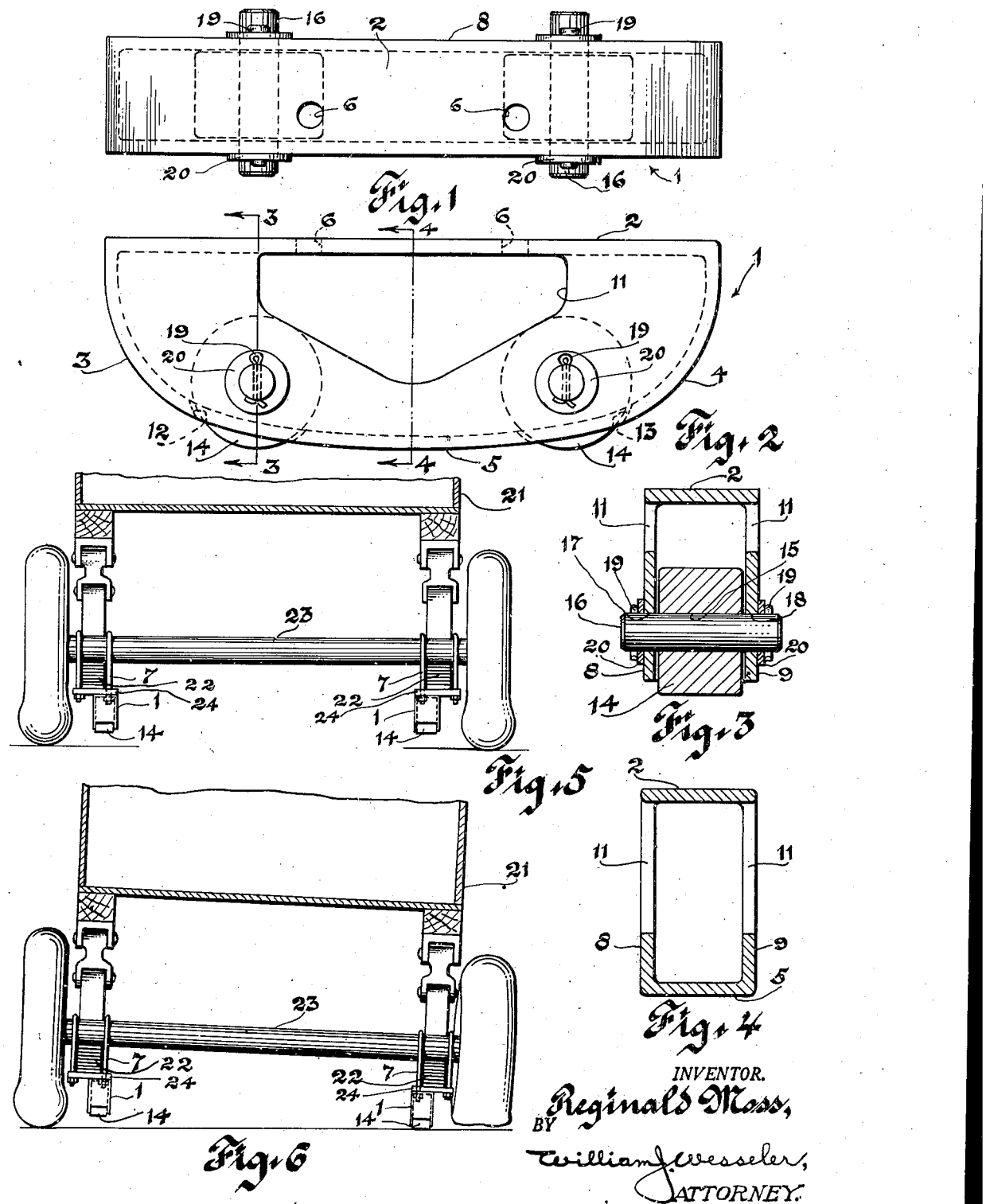

2,461,758

UNITED STATES PATENT OFFICE 2,461,758

TIRE-PROTECTING SKID

Reginald Moss, North Miami, Fla., assignor of one-half to Ray Ferwerda, Cleveland, Ohio Application May 31, 1946, Serial No. 673,541

4 Claims. (Cl. 280—150)

This invention relates to a tire-protecting skid. More particularly, it comprises a device, preferably in the form of a steel runner, adapted to be firmly bolted to the under side of the axle, axle housing, or leaf spring of an automotive vehicle, or an automobile trailer, or the like, closely adjacent the inside of the running position of the wheel and spaced slightly above the roadway whereby, upon the deflation of the tire, the weight of the vehicle will be taken by the skid and the tire will be protected from damage until the vehicle can be brought to a complete stop.

The invention includes a structure wherein a simple skid is utilized and also one wherein small wheels are positioned adjacent the curved ends of each skid member so that contact with the highway in the event of the inclination of the skid will take place against one of the wheels during the interval when the skid is being brought into parallel contact with the roadway.

The invention also includes the construction of the skid as a hollow double-walled unit having a centrally cut-away area permitting easy attachment to, and removal of the skid from, the vehicle as may be required at any time.

The principal object of the present invention is to provide a tire-protecting skid adapted for automotive vehicles and automobile trailers and the like which will prevent total destruction of a tire in the event of its deflation through accident or conditions of wear and will also protect the vehicle from accidental injury.

Another object of the invention is to provide a tire-protecting skid provided with rollers adjacent the front and rearward ends thereof which permit emergency road contact of the skid at various angles without excessive shock.

Another object of the invention is to supply a simple framed structure adapted to be secured to the axle of a vehicle or to the leaf spring mounted thereon, in closely adjacent position to a tire and with predetermined clearance from the road surface, and which will become effective upon the deflation of the tire to prevent injury thereto.

Other and further objects of the invention will appear in the course of the following description.

To the accomplishment of the foregoing and related ends, said invention consists of the means hereinafter fully described and particularly pointed out in the claims.

The annexed drawing and the following description set forth in detail certain structure embodying the invention, such disclosed means constituting, however, but one of various structural forms in which the principle of the invention may be used.

In said annexed drawing:

Figure 1 is a top plan view showing a tire-protecting skid device embodying the principles of the invention;

Figure 2 is a side elevation of the structure shown in Figure 1;

Figure 3 is a central vertical sectional view taken through one of the rollers as seen along the line 3—3 indicated in Figure 2, looking in the direction of the arrows;

Figure 4 is a central vertical sectional view taken through the main body portion of the skid as seen along the line 4—4 indicated in Figure 2, looking in the direction of the arrows;

Figure 5 is a transverse view, partly in section, showing a pair of skids positioned beneath a spring of an automobile trailer, in tire-protecting relation to the adjacent tires; and Figure 6 is a view similar to Figure 5, showing the right hand skid member brought into contact with the roadway through the deflation of the adjacent tire.

As is clearly shown in the drawing, the safety skid comprises a body member 1 in the form of an elongated member having a flat top surface 2 and curved end surfaces 3, 4, merging with a slightly curved bottom surface 5. The body member may be formed as an integral member or may be built up of separate sheet metal parts welded or otherwise securely connected together. The top surface 2 preferably is provided at an intermediate position with bolt holes 6 by means of which the body member may be firmly secured to the under side of the leaf spring, axle housing, or axle of the automobile adjacent the position of the tire which it is desired to protect from injury. The bolt holes 6 may be offset slightly from the central line of the body member to permit the use of a fastening means such as the ends of one of the U-bolts 7, securing the spring to the axle, engaged in each of said bolt holes, such as is shown in Figures 5 and 6, for securing the body member to the underside of a leaf spring. In order to reduce the weight of the body member the respective side walls 8 and 9 thereof are preferably cut away so as to provide an elongated opening 11 extending over the central upper area of these walls. The curved bottom surface of the body member 5 is cut away adjacent its point of merger with the curved end portions 3 and 4, respectively, to provide openings 12 and 13 to receive rollers 14 which project slightly below the surface of the body member at their point of support so as to be approximately in line with the central body surface of the skid member. Each of the rollers 14 is provided with a central opening 15 of a size to receive a short axle shaft 16 supported within apertures 17, 18, in their respective side walls of the body member and held in position by means of cotter pins 19, engaged through apertures adjacent each end of said axle shaft and bearing directly upon washers 20 placed against the side walls of the body member.

The skid may be used without the rollers, but in the event of an emergency contact with a hard-surfaced roadway at a point where there is curvature in the roadway, the rollers will provide a cushioning effect and will prevent interference with the steering of the vehicle.

The invention is of particular value in connection with the protection of tires on 2-wheel trailers such as are customarily coupled to passenger automobiles of relatively light construction. The trailers may be house trailers of considerable size and weight, or, in some instances, are 2-wheel baggage-carrying structures which are very heavily laden. In view of the road contact of the trailer being spaced some considerable distance behind the passenger car, the deflation of a tire on the trailer frequently seriously interferes with the steering of the passenger car and may result in the trailer swaying to one side and off the road surface with serious consequences to the vehicle and its passengers. The advantages of the invention in connection with a 2-wheel trailer are illustrated in Figures 5 and 6, wherein the trailer 21 is supported on leaf springs 22 which, as shown, are positioned beneath the axle 23, but may be positioned above the same if desired. The tire-protecting skid may be connected with either the axle, axle housing, or spring, but as shown in Figures 5 and 6 is connected, as above described, directly to the spring by means of a pair of standard U-bolts 7 engaging over the spring on each side of the position of the axle, and engaging through openings in an anchor plate 24. The bolts may be tightened against the spring by screwing the nuts on the free ends of the bolts firmly into contact with the under side of the top member 2 of the body member 1. Spacing blocks may be used to space the lower side of the body member a predetermined distance from the road surface. Instead of using the standard U-bolts 7 to secure the body member to the spring, the separate bolt fittings connecting with the spring or with the axle may be used for such purpose, but the use of U-bolts as the securing means has been found very satisfactory in practice. Access to the bolts is provided for through the large openings 11 heretofore described.

When the tire of a 2-wheel trailer of the character described is deflated, the skid will move a slight distance to rest upon the road surface and the axle will be turned at a slight transverse angle toward the deflated tire, but total deflation of the tire is prevented and the weight of the vehicle is completely removed from the tire, and consequently no abrading action takes place upon the tire surface. The steering action of the passenger automobile will not be interfered with to any appreciable extent as there is relatively slight retarding effect induced through the contact of the skid with the road surface. The protection afforded by the skid members is not only of value in protecting the tires of the trailer, but is of much importance from the standpoint of protecting the passengers of the automobile or the trailer from serious injury due to loss of control of the automobile by reason of the irregular movement of the trailer over the road surface.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a safety attachment for an automobile trailer, the combination with a body, a pair of springs connected with said body, an axle supported adjacent each of its ends on said springs and wheels provided with tires mounted on the opposite end portions of said axle, of an elongated tire-protecting skid member fixedly secured intermediate its ends to each of said springs at the point of connection of the latter with said axle in a position adjacent and parallel to the tire on the adjacent wheel and in predetermined spaced relation to the road surface, each of said members having spaced side walls, and rollers mounted between the side walls of each of said members adjacent the opposite ends of said walls, said rollers having portions extending outwardly of the adjacent side walls and adapted to engage the road surface in the event the adjacent tire becomes deflated.

2. An automobile trailer provided with a body, a pair of springs connected with said body, an axle supported adjacent each of its ends on said springs and carrying wheels and tires outwardly thereof, of a tire-protecting body member below each of said springs and consisting of side, top, and bottom walls, rollers mounted in each of said body members adjacent the opposite ends thereof and projecting substantially in alignment with said bottom wall, and providing a curved under-surface positioned beneath each spring below its point of connection with the axle, and means for firmly securing said body member to said spring on each side of said trailer in closely spaced relation to said tire and in predetermined spaced relation to the road surface.

3. An automobile trailer provided with a body, a pair of springs connected with said body, an axle supported by means of pairs of U-bolts adjacent each of its ends on said springs and carrying wheels and tires outwardly thereof, of a hollow sheet metal tire-protecting body member consisting of side, top and bottom walls positioned beneath each said spring below its point of connection with the axle, and having holes through the top wall to receive the ends of one of said U-bolts to provide means, accessible through openings in the side walls, for firmly securing said body member to said spring on each side of said trailer in closely spaced relation to said tire and in predetermined spaced relation to the road surface.

4. An automobile trailer provided with a body, a pair of springs connected with said body, an axle supported adjacent each of its ends on said springs by means of a pair of U-bolts, respectively, and carrying wheels and tires outwardly thereof, of a tire-protecting body member supported on one of said pairs of U-bolts on each side of said axle and consisting of side, top, and bottom walls, with rollers mounted in said body member adjacent the opposite ends thereof and projecting substantially in alignment with said under-surface, and providing a curved under surface positioned beneath each spring below its point of connection with the axle.

REGINALD MOSS.

REFERENCES CITED

The following references are of record in the file of this patent:

UNITED STATES PATENTS

| Number | Name | Date |
|---|---|---|
| 1,756,006 | Marks | Apr. 22, 1930 |
| 2,075,934 | Gold | Apr. 6, 1937 |
| 2,102,835 | Catalina | Dec. 21, 1937 |

FOREIGN PATENTS

| Number | Country | Date |
|---|---|---|
| 417,303 | Germany | Aug. 11, 1925 |